United States Patent [19]
Ewert et al.

[11] Patent Number: 5,524,167
[45] Date of Patent: Jun. 4, 1996

[54] HOLDER FOR LOOSE OPTICAL FIBERS

[76] Inventors: Robert A. Ewert, 3132 SW. Marigold #10, Portland, Oreg. 97219; Warren R. Hill, 1856 SW. Edgewood Rd., Portland, Oreg. 97201; David A. Kritler, 524 Country Club Rd., Lake Oswego, Oreg. 97034; Martin L. Boehme, 20232 S. Jasan Dr., Oregon City, Oreg. 97045

[21] Appl. No.: 378,619

[22] Filed: Jan. 26, 1995

[51] Int. Cl.$^6$ .................. G02B 6/00; G02B 6/36
[52] U.S. Cl. ........................................... 385/137
[58] Field of Search .................. 385/137, 147, 385/136

[56] References Cited

U.S. PATENT DOCUMENTS

| | | | |
|---|---|---|---|
| 4,029,390 | 6/1977 | Chinnock et al. | 385/137 |
| 4,373,776 | 2/1983 | Purdy | 385/135 |
| 4,432,602 | 2/1984 | Margolin | 385/137 |
| 4,679,896 | 7/1987 | Krafcik et al. | 385/135 |
| 4,744,627 | 5/1988 | Chande et al. | 385/137 |
| 5,182,789 | 1/1993 | Nash-Stevenson et al. | 385/137 |
| 5,235,664 | 8/1993 | Okada et al. | 385/137 X |
| 5,422,974 | 6/1995 | Brown et al. | 385/137 X |

*Primary Examiner*—Akm E. Ullah
*Attorney, Agent, or Firm*—Smith-Hill and Bedell

[57] ABSTRACT

A holder for receiving and holding a plurality of loose optical fibers which are of substantially equal thickness, comprises a base plate having a top surface on which the fibers can rest in side by side relationship, and an abutment projecting above the top surface of the base plate and defining a shoulder against which one of the fibers resting on the top surface can engage. A keeper extends over the top surface of the base plate in spaced relationship therewith for restraining the fibers against movement away from the top surface, and a lid is pivotable relative to the base plate between a closed position, in which it engages the fibers, and an open position. The base plate includes a permanent magnet and the lid includes magnetic material, whereby when the lid is in the closed position, it is retained in that position by magnetic attraction.

14 Claims, 3 Drawing Sheets

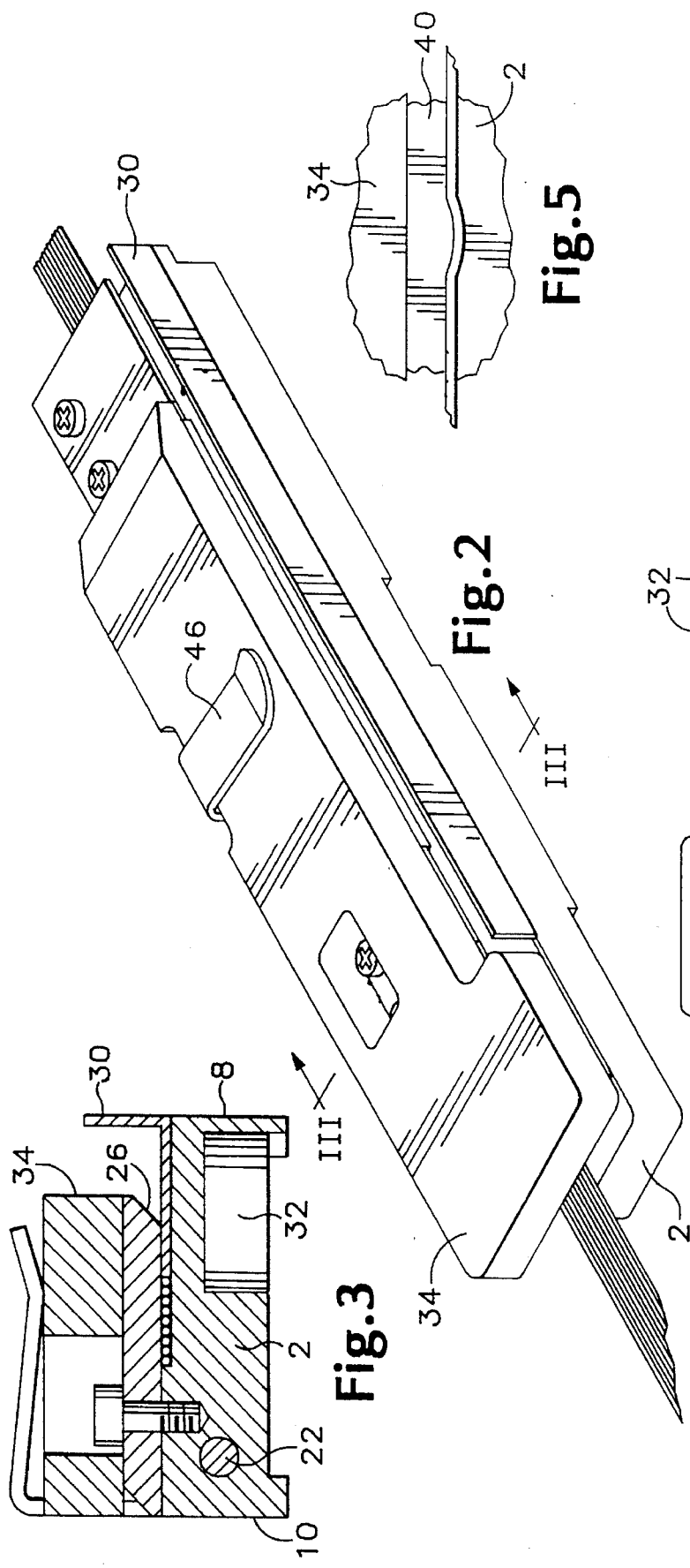

5,524,167

HOLDER FOR LOOSE OPTICAL FIBERS

BACKGROUND OF THE INVENTION

This invention relates to a holder for receiving loose optical fibers.

Optical fibers that are currently commercially available comprise a central glass core, a glass cladding that surrounds the core, and a coating of synthetic polymer material. Typically, the external diameter of the cladding is about 125 µm and the external diameter of the polymer coating is approximately 250 µm.

In some markets, optical fiber is used mainly in ribbon form, whereas in other markets it is more common to use optical fiber in the form of individual loose fibers. In ribbon fiber, the individual component fibers are bonded together in approximately parallel side-by side relationship, such that in any perpendicular cross section through the ribbon fiber, the points at which the central axes of the individual component fibers pass through the plane of the section lie approximately on a straight line.

U.S. Pat. No. 5,375,179, the disclosure of which is hereby incorporated by reference herein, discloses a test instrument in which an end segment of a ribbon fiber is held in a ribbon fiber clamp or holder. A practical implementation of that instrument, sold by Photon Kinetics, Inc. as its OASYS 1000 instrument, includes a carriage that is provided with locating features for receiving the ribbon fiber holder. The ribbon fiber holder may be, for example, the holder that is sold by Photon Kinetics as option 1000-B12 for the OASYS 1000 instrument.

In order to test an optical fiber, it is generally necessary to prepare the fiber by stripping the polymer coating from an end segment of the fiber and cleaving the stripped fiber end segment. A ribbon fiber having an end segment that is held in the Photon Kinetics 1000-B12 ribbon fiber holder may be prepared for testing using the Photon Kinetics 1000-RST ribbon fiber stripper for stripping the polymer coating and the Photon Kinetics 1000-RCL ribbon fiber cleaver for cleaving the stripped ribbon fiber end segment. These fiber preparation devices are specifically designed for use with fibers that are in ribbon form.

Hitherto, in order to use a ribbon fiber test instrument, such as the Photon Kinetics OASYS 1000 instrument, for testing loose fibers, it has been necessary to ribbonize the fibers by holding them in a clamping device and applying some form of adhesive to the fibers. When the fibers have been ribbonized in this manner, the fibers can be prepared for testing by stripping and cleaving.

It is inconvenient and time consuming to ribbonize loose fibers in the manner described above. Moreover, the coatings used for ribbon fiber are generally designed so that the coating can be stripped from all the component fibers at once, often in one piece, whereas loose fibers are intended to be stripped singly. Consequently, the force required to strip several ribbonized loose fibers at one time is considerably greater than that needed to strip a ribbon fiber composed of a comparable number of individual fibers. Therefore, even when the loose fibers have been ribbonized, it is more difficult to use the same ribbon fiber holder and hot jacket stripper as are used for ribbon fibers to hold and strip the ribbonized fibers, because the holder does not grip the fibers firmly enough to allow sufficient stripping force to be applied.

SUMMARY OF THE INVENTION

According to a first aspect of the present invention there is provided a holder for receiving and holding a plurality of discrete elongate members which are of substantially equal thickness, comprising a base member having a top surface on which the elongate members can rest in side by side relationship, an abutment member above the top surface of the base member and defining a shoulder against which one of the elongate members resting on said top surface can engage, a keeper extending over the top surface in spaced relationship therewith for restraining the elongate members against movement away from the top surface, a lid that is movable relative to the base member between a closed position, in which it engages the elongate members, and an open position, and a means for retaining the lid in the closed position.

According to a second aspect of the present invention there is provided a holder for receiving and holding a plurality of loose optical fibers which are of substantially equal thickness, comprising a base member having a top surface on which the fibers can rest in side by side relationship, an abutment member above the top surface of the base member and defining a shoulder against which one of the fibers resting on said top surface can engage, a keeper extending over the top surface in spaced relationship therewith for restraining the fibers against movement away from the top surface, and a lid member that is pivotable relative to the base member between a closed position, in which it engages the fibers, and an open position, and wherein at least one of the lid member and the base member includes permanent magnet material and the other of the lid member and the base member includes magnetic material, whereby when the lid member is in the closed position, it is retained in that position by magnetic attraction.

A preferred embodiment of the present invention is a loose fiber holder that restrains multiple loose fibers in a ribbon-like configuration, with fiber ends projecting from the holder, so that the fibers can be handled as an entity for some purposes, such as stripping and cleaving using ribbon fiber preparation tools, yet allows ready interaction with individual fibers (viewing, coupling, etc.) by virtue of the fact that the fiber end segments projecting from the holder are at uniform spacing with axes parallel and coplanar.

BRIEF DESCRIPTION OF THE DRAWINGS

For a better understanding of the invention, and to show how the same may be carried into effect, reference will now be made, by way of example, to the accompanying drawings, in which FIG. 2 is a perspective view of the holder in closed position, FIG. 3 is a sectional view on the line III—III of FIG. 2, FIG. 4 is a bottom plan view of the holder, FIG. 5 is an enlarged side view of the holder in closed position with the packer removed.

DETAILED DESCRIPTION

Figure 1:
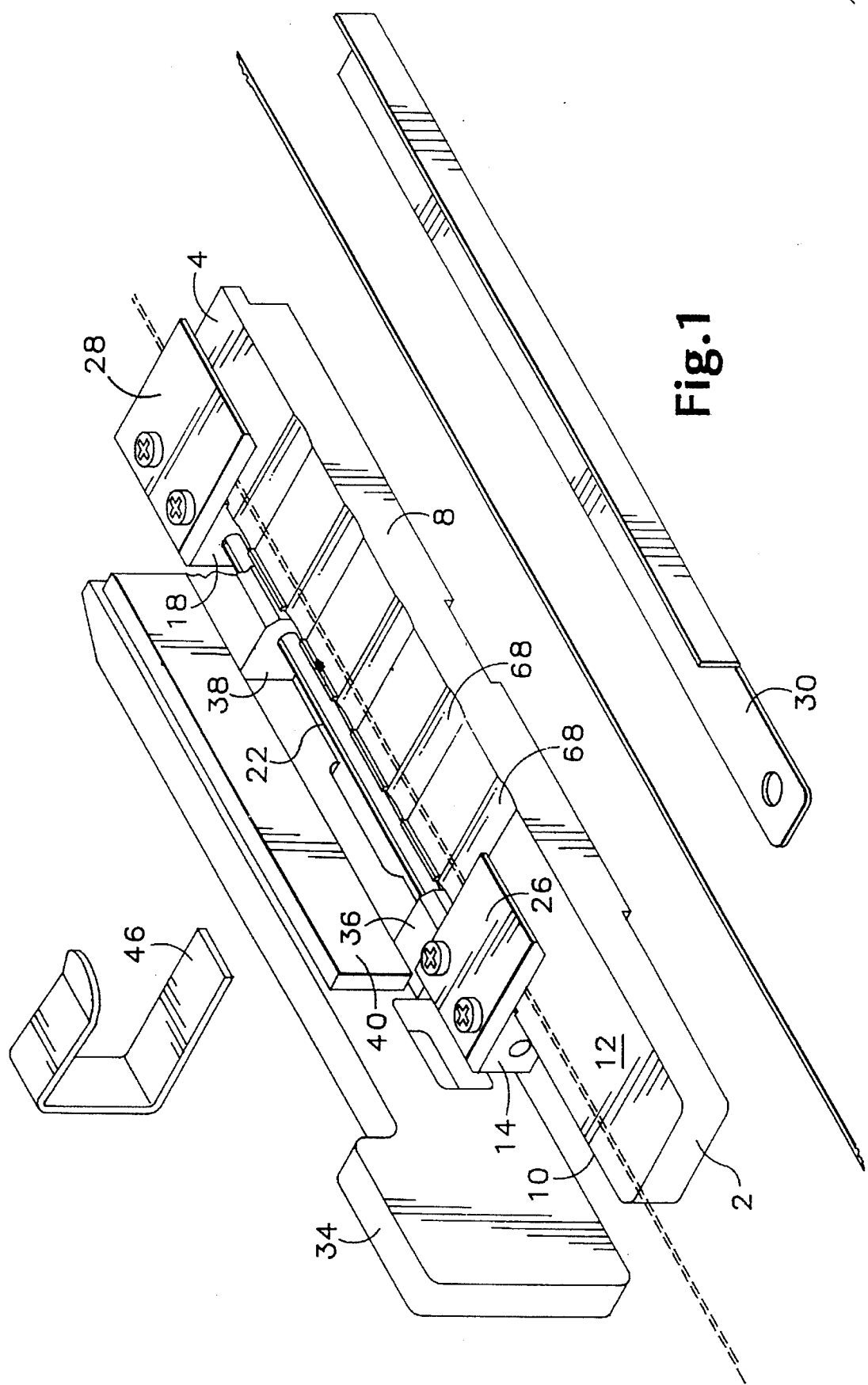
FIG. 1 is a partially exploded perspective view of a loose fiber holder in accordance with the invention in open position.

The fiber holder that is shown in the drawings comprises a generally rectangular base plate 2 having a forward end region 4, a near edge 8, and a far edge 10. The main portion of the base plate has a top surface 12. The width and length of the base plate 2 are equal to the width and length of the base plate that is used in the Photon Kinetics 1000-B12 ribbon fiber holder. At its far edge 10, the base plate includes two projecting lugs 14 and 18, and a hinge pin 22 extends between these two lugs. Each of the lugs extends somewhat above the top surface 12 of the main portion of the base plate and forms an abutment surface or shoulder at the far edge of the base plate. Two keeper plates 26 and 28 are mounted on the lugs so that they extend toward the near edge 8 of the base plate. Because the lugs project above the surface 12, the lower surface of each keeper plate is spaced slightly from the surface 12. The spacing is somewhat greater than the nominal diameter of a coated fiber plus its tolerance, which for standard telecommunication grade fiber is approximately 260 to 270 μm. Other fiber diameters could be accommodated by changing this spacing.

The base plate 2 and the keeper plates 26 and 28 are made of a non-magnetic material, such as an aluminum alloy. Several magnets 32 are held in recesses in the lower surface of the base plate.

A packer 30 made of magnetic material is thin enough to fit between the keeper plates 26, 28 and the base plate 2. Preferably, the packer thickness is approximately equal to the nominal diameter of the fibers being restrained.

A lid 34 made of magnetic material is attached to the base plate 2 by way of the hinge pin 22, the lid having two projecting lugs 36, 38 through which the pin 22 extends. The lid has a clamping surface to which a pad 40 of resiliently compressible material is attached.

In use of the fiber holder, a single loose fiber is placed by hand so that it extends over the surface 12, between the keeper plates and the near edge of the base plate, and projects beyond the forward end region 4 of the base plate. The fiber is displaced transversely of its length so that it moves toward the far edge of the base plate and passes between the keeper plates and the base plate, as shown in phantom in FIG. 1. It will be noted that the near edge of each keeper plate is beveled at its underside to guide movement of the fiber. A first loose fiber is thereby installed between the keeper plates and the base plate. Subsequent loose fibers are placed on the base plate and are similarly pushed toward the far edge 10 of the base plate so that they are installed between the keeper plates and the base plate.

When the desired number of loose fibers have been installed, the packer 30 is placed on the surface 12. The magnetic force due to the magnets 32 pulls the packer toward the far edge of the base plate 2, and the leading edge of the packer engages the last fiber and pushes it toward the abutment surface. Because the clearance between the base plate and the keeper plates is approximately the diameter of a loose fiber, the fiber axes are kept in approximately the same plane when they are pushed toward the abutment surface. In this manner, the individual loose fibers are brought into side-by-side parallel contacting relationship, with the first fiber fitted snugly against the abutment surface. The lid 34 is then closed, and magnetic attraction holds the lid in its closed position, with the pad 40 pressing against the fibers. A C-shaped spring clip 46 may be applied to hold the lid in its closed position relative to the base. In this manner, the loose fibers are brought into a ribbon configuration without need for adhesives.

Figure 6:
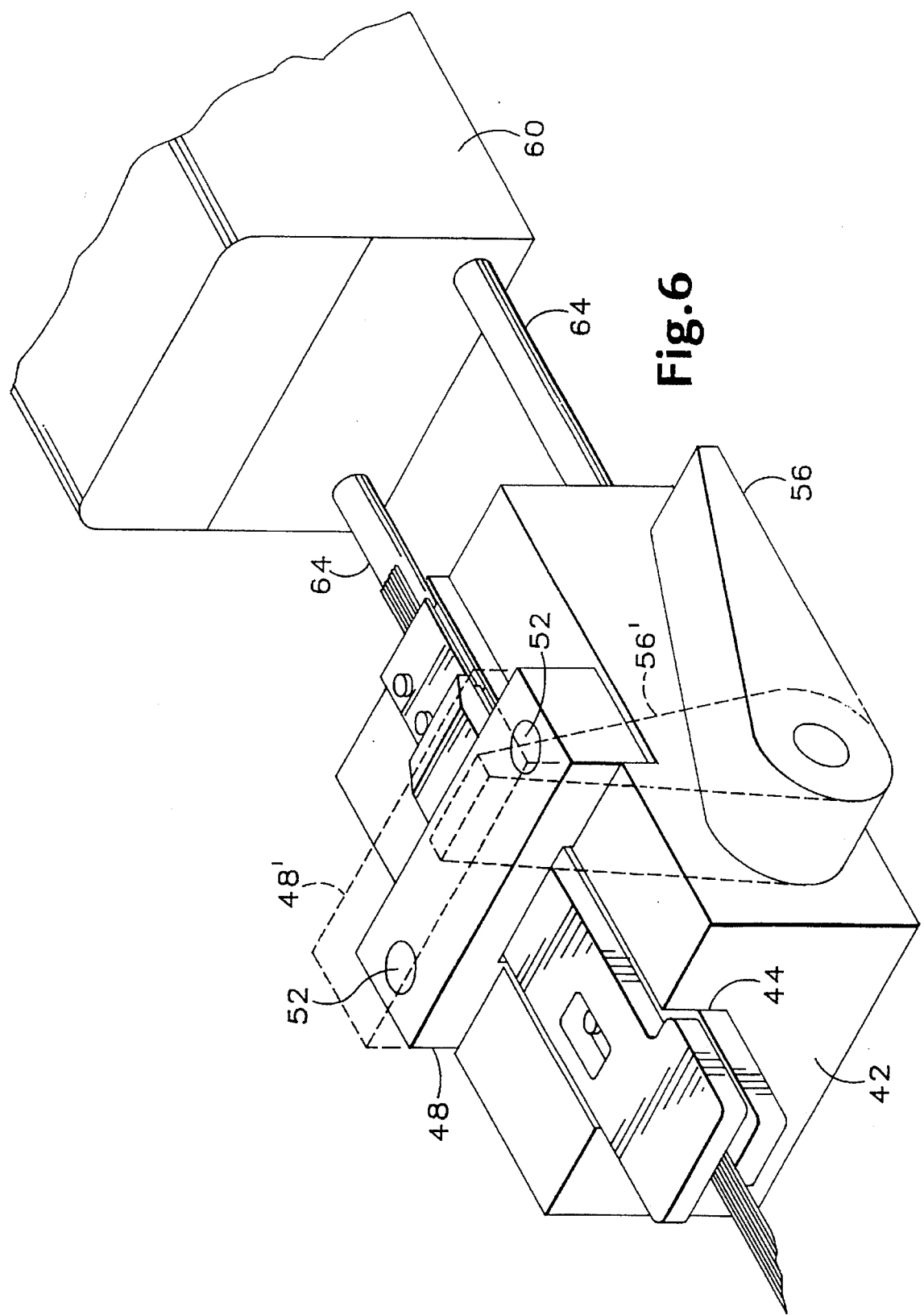
FIG. 6 is a perspective view showing the holder fitted in a holder clamp.

The holder clamp that is shown in FIG. 6 comprises a receiver block 42 defining a channel 44 for receiving the fiber holder. A clamping yoke 48 extends across the channel 44. The clamping yoke is urged vertically upward relative to the receiver block 42 by springs (not shown), its movement being limited by vertically disposed screws 52. The screws 52 are coupled to an actuating lever 56 that is pivotable relative to the block 42, such that when the lever is moved from the position shown in solid line to the position 56' shown in dashed lines, the screws are displaced axially upward and allow the springs to urge the yoke 48 to the position 48', and conversely when the lever is moved from the position 56' to the position shown in solid line the screws are displaced axially downward and pull the yoke downward against the force of the springs.

In operation of the clamp, the lever 56 is swung to the position 56', thus allowing the clamping yoke 48 to be forced upward by the springs. The fiber holder containing the fibers whose ends are to be prepared is placed in the channel 44. The forward end of the base plate 2 engages a shoulder (not shown) at the forward end of the channel, and the fiber ends project beyond the block 42 toward a hot jacket stripper 60. The lever 56 is then swung in the clockwise direction to the position shown in solid line, thereby pulling the yoke 48 downward, against the force of the springs, into firm engagement with the fiber holder. The fiber holder is thereby clamped between the yoke 48 and the base of the channel 44. A spacer (not shown) may be provided beneath the clamping yoke in order to ensure that the clamping force is applied directly to the lid 34 of the fiber holder and does not damage the clip 46. In this manner, the loose fibers are gripped firmly between the pad 40 and the base plate 2, and are held by friction against longitudinal movement relative to the fiber holder.

The hot jacket stripper 60, which may the Photon Kinetics 1000-RST ribbon fiber stripper, is then advanced along the guide rods 64, which project from the clamping block 42, and the leading ends of the fibers, projecting from the forward end of the fiber holder, are received by the stripper. The forward ends of the fibers are gripped between two heated jaws of the stripper and the stripper is pulled away from the clamp, along the guide rods 64, stripping the coating from the fiber.

By using the clamp to grip the fiber holder, the frictional force retaining the fibers against longitudinal movement is sufficient to resist the force that must be applied in order to strip the coating from the loose fibers.

It will be noted that the top surface 12 of the base plate 2 is formed with shallow grooves 68 between the keeper plates. When the holder is clamped by the clamping yoke against the base of the channel 44, the resiliently deformable pad 40 forces the fibers to bend somewhat and conform to the grooves, and this results in a greater frictional force against longitudinal movement of the fibers than if the surface 12 were planar. It is important to note, however, that the surface 12 should not be rough, because roughness could lead to relatively sharp bends in the fibers, and it is known that sharp bends degrade the optical transmission properties of an optical fiber.

After the fiber ends have been stripped and the residue of the stripping operation removed, the fiber holder is removed from the clamp and is inserted in a fiber cleaver, which may be the Photon Kinetics 1000-RCL ribbon fiber cleaver, and the fibers are cleaved at a consistently precise distance from the forward end face of the holder. The fiber holder may then be placed on the carriage of the Photon Kinetics OASYS 1000 instrument, employing the locating features that are adapted to receive the Photon Kinetics 1000-B12 ribbon fiber holder, and the loose fibers can then be tested. After testing, the fibers can be removed from the fiber holder and processed in conventional fashion.

It will be appreciated that this invention is not restricted to the particular embodiment that has been described, and that variations may be made therein without departing from the scope of the invention as defined in the appended claims and equivalents thereof. For example, the invention is not restricted to the fiber holder being of the same dimensions as the Photon Kinetics 1000-B12 ribbon fiber holder or to the fiber holder being dimensioned to fit in the Photon Kinetics OASYS 1000 instrument. The fiber holder could be used in any measurement system, coupling apparatus, or splicing apparatus where it would be useful to handle or prepare a number of fibers as a group, but still be able to interact with the individual fibers. In particular, the loose fiber holder could be used to present multiple fiber end segments to an array of physical restraints, such as V-grooves, or to other fiber end segments in a second fiber holder. Also, it is not essential that the abutment surface be provided by a portion of the base plate, since it could be provided by a shim between the base plate and the keeper plates or by a portion of the keeper plates, for example.

We claim:

1. A holder for receiving and holding a plurality of discrete elongate members which are of substantially equal thickness, comprising:

a base member having a substantially flat top surface on which respective substantially straight segments of the elongate members can rest in side by side, parallel, contacting relationship, an abutment member above the top surface of the base member and defining a shoulder against which the substantially straight segment of one of the elongate members can engage, a keeper extending over the top surface in spaced relationship therewith for restraining the substantially straight segments of the elongate members against movement away from the top surface, a lid that is movable relative to the base member between a closed position, in which it engages the substantially straight segments of the elongate members, and an open position, and a means for retaining the lid in the closed position.

2. A holder according to claim 1, comprising a packer adapted to fit removably between the keeper and the top surface of the base member for urging the substantially straight segments of the elongate members toward the shoulder.

3. A holder according to claim 2, wherein the base member includes permanent magnet material and the packer is made of magnetic material, whereby the packer is urged toward the shoulder by magnetic force.

4. A holder according to claim 3, wherein the base member comprises a base plate of non-magnetic material and at least one permanent magnet embedded in the base plate.

5. A holder according to claim 1, wherein the base member includes permanent magnet material and the lid includes magnetic material, whereby the lid is retained in the closed position by magnetic force.

6. A holder according to claim 5, wherein the base member comprises a base plate of non-magnetic material and at least one permanent magnet embedded in the base plate.

7. A holder according to claim 1, wherein the lid comprises a pad of resiliently deformable material that engages the substantially straight segments of the elongate members, and a rigid backup member to which the pad is attached.

8. A holder according to claim 1, wherein the lid is attached to the base member for pivotal movement relative thereto.

9. A holder according to claim 1, wherein the lid comprises a pad of resiliently deformable material that engages the substantially straight segments of the elongate members, and a rigid backup member to which the pad is attached, whereby when the lid is in closed position and is urged toward the top surface of the base member, the pad forces the substantially straight segments of the elongate members to conform to the configuration of the top surface of the base member, the top surface of the base member having at least two planar regions that are separated by a groove extending transversely of the shoulder.

10. A holder for receiving and holding a plurality of loose optical fibers which are of substantially equal thickness, comprising:

a base member having a substantially flat top surface on which respective substantially straight segments of the fibers can rest in side by side, parallel, contacting relationship, an abutment member above the top surface of the base member and defining a shoulder against which one of the substantially straight segments of the fibers can engage, a keeper extending over the top surface in spaced relationship therewith for restraining the substantially straight segments of the fibers against movement away from the top surface, and a lid member that is pivotable relative to the base member between a closed position, in which it engages the substantially straight segments of the fibers, and an open position, and wherein at least one of the lid member and the base member includes permanent magnet material and the other of the lid member and the base member includes magnetic material, whereby when the lid member is in the closed position, it is retained in that position by magnetic attraction.

11. A holder according to claim 10, wherein the base member includes permanent magnet material and the lid member includes magnetic material, and the holder further comprises a packer adapted to fit between the keeper and the top surface of the base member for urging the substantially straight segments of the fibers toward the shoulder, the packer being made of magnetic material, whereby the packer is urged toward the shoulder by magnetic attraction to the permanent magnet material in the base member.

12. A holder according to claim 10, comprising first and second keepers extending over the top surface of the base member in spaced relationship therewith and spaced apart from each other along the shoulder, and wherein the top surface of the base member has at least two planar regions that are separated by a groove that extends transversely of the shoulder, said planar regions and said groove being between the first and second keepers, and the lid comprises a rigid backup member and a pad of resiliently deformable material that is attached to the backup member and is between the keepers and engages the substantially straight segments of the fibers when the lid is in closed position, whereby when the lid is in closed position and is urged toward the top surface of the base member, the pad is located between the keepers and forces the substantially straight segments of the fibers to conform to the configuration of the top surface of the base member between the keepers.

13. A holder according to claim 3, wherein the lid includes magnetic material, whereby the lid is retained in the closed position by magnetic force.

14. A holder according to claim 1, comprising first and second keepers extending over the top surface of the base member in spaced relationship therewith and spaced apart from each other along the shoulder, and wherein the top surface of the base member has at least two planar regions that are separated by a groove that extends transversely of the shoulder, said planar regions and said groove being between the first and second keepers, and the lid comprises a rigid backup member and a pad of resiliently deformable material that is attached to the backup member and is between the keepers and engages the substantially straight segments of the elongate members when the lid is in closed position, whereby when the lid is in closed position and is urged toward the top surface of the base member, the pad is located between the keepers and forces the substantially straight segments of the elongate members to conform to the configuration of the top surface of the base member between the keepers.

* * * * *